US008624169B1

(12) United States Patent
Sorenson et al.

(10) Patent No.: US 8,624,169 B1
(45) Date of Patent: Jan. 7, 2014

(54) ELECTRIC GRILLING APPLIANCE

(76) Inventors: Wally B. Sorenson, Lake Preston, SD (US); Adam Sorenson, Lake Preston, SD (US)

( * ) Notice: Subject to any disclaimer, the term of this patent is extended or adjusted under 35 U.S.C. 154(b) by 1158 days.

(21) Appl. No.: 12/074,330

(22) Filed: Mar. 3, 2008

Related U.S. Application Data

(63) Continuation-in-part of application No. 10/960,654, filed on Oct. 7, 2004, now Pat. No. 7,339,137.

(51) Int. Cl.
*A47J 37/06* (2006.01)
*A47J 37/07* (2006.01)
*A21B 1/40* (2006.01)
*F24C 7/08* (2006.01)
*H05B 1/02* (2006.01)

(52) U.S. Cl.
USPC ........... 219/494; 219/386; 219/413; 219/492; 219/497; 99/333

(58) Field of Classification Search
None
See application file for complete search history.

(56) References Cited

U.S. PATENT DOCUMENTS

| | | | |
|---|---|---|---|
| 2,557,832 A | 6/1951 | McCormick | |
| 2,767,298 A | 10/1956 | Fry | |
| 2,914,644 A * | 11/1959 | Holtkamp | 219/413 |
| 3,604,408 A | 9/1971 | Tescula | |
| 4,054,778 A * | 10/1977 | Wollich | 219/413 |
| 4,089,258 A | 5/1978 | Berger | |
| 4,149,516 A | 4/1979 | Hall | |
| 4,301,509 A * | 11/1981 | Haase et al. | 700/300 |
| 4,338,511 A | 7/1982 | Six | |
| 4,392,038 A | 7/1983 | Day et al. | |
| 4,532,911 A | 8/1985 | Orter | |
| 4,561,418 A | 12/1985 | Cairns | |
| 4,619,190 A | 10/1986 | Smith | |
| 4,641,015 A | 2/1987 | Mayeur | |
| 4,815,439 A * | 3/1989 | Houck | 126/39 G |
| 4,817,510 A * | 4/1989 | Kowalics et al. | 99/331 |
| 4,899,724 A | 2/1990 | Kuechler | |
| 4,917,006 A | 4/1990 | Bowen et al. | |
| 5,355,779 A | 10/1994 | O'Brien et al. | |
| 5,445,066 A | 8/1995 | Rosset | |
| 5,456,163 A | 10/1995 | Ceravolo | |

(Continued)

FOREIGN PATENT DOCUMENTS

| | | |
|---|---|---|
| DE | 3312041 A1 | 10/1984 |
| DE | 29623114 U1 | 11/1997 |
| JP | 02-279117 A | 11/1990 |

*Primary Examiner* — Joseph M Pelham
(74) *Attorney, Agent, or Firm* — Jeffrey A. Proehl; Woods, Fuller, Shultz & Smith, P.C.

(57) ABSTRACT

A heating appliance comprises a chamber portion defining a heating chamber, a lid portion, a heating apparatus to heat air in the heating chamber, a food temperature sensor to sense an internal temperature of an item located in the heating chamber, a user interface configured to receive designation of a desired time of completion of heating of the item from the user, and a control circuit configured to control the supply of power to the heating apparatus. The control circuit is in communication with the temperature sensor and the user interface. The control circuit may control the heating apparatus so that the internal temperature of the item reaches a predetermined temperature at the desired time of completion designated by the user. The control circuit may control the heating apparatus so that the internal temperature of the item is maintained at a predetermined temperature for a predetermined period of time before an end of the desired time of completion.

23 Claims, 13 Drawing Sheets

(56) References Cited

U.S. PATENT DOCUMENTS

| | | |
|---|---|---|
| 5,471,916 A | 12/1995 | Bird et al. |
| 5,473,979 A | 12/1995 | Ruben |
| 5,575,196 A | 11/1996 | Masel |
| 5,582,094 A | 12/1996 | Peterson et al. |
| 5,718,165 A | 2/1998 | Winstead |
| 5,719,377 A | 2/1998 | Giebel |
| 5,782,168 A | 7/1998 | Krhnak |
| 5,968,387 A | 10/1999 | Guerrier et al. |
| 5,970,851 A | 10/1999 | Masel |
| 6,037,571 A | 3/2000 | Christopher |
| 6,082,351 A | 7/2000 | Faraj |
| 6,104,004 A | 8/2000 | Ragland et al. |
| 6,615,706 B1 * | 9/2003 | Wu .................................. 99/331 |
| 6,818,865 B2 * | 11/2004 | Mangina ........................ 219/413 |
| 7,102,107 B1 * | 9/2006 | Chapman ....................... 219/494 |
| 7,445,381 B2 * | 11/2008 | Rund et al. ..................... 374/102 |
| 7,516,692 B2 * | 4/2009 | Pirkle et al. ...................... 99/333 |
| 7,608,803 B2 * | 10/2009 | Jerovsek ........................ 219/391 |
| 7,628,105 B2 | 12/2009 | Umit |
| 8,109,205 B1 | 2/2012 | Winer |
| 2003/0007544 A1 * | 1/2003 | Chang et al. ................... 374/100 |
| 2006/0138118 A1 | 6/2006 | Chan |
| 2006/0207986 A1 * | 9/2006 | Brown .......................... 219/386 |
| 2007/0215599 A1 * | 9/2007 | Kahler .......................... 219/492 |
| 2008/0043809 A1 * | 2/2008 | Herbert .......................... 374/163 |
| 2010/0297321 A1 | 11/2010 | Strauch |

* cited by examiner

TO FIG. 12B

ELECTRIC GRILLING APPLIANCE

REFERENCE TO RELATED APPLICATION

This application is a continuation-in-part of application Ser. No. 10/960,654, filed Oct. 7, 2004, now U.S. Pat. No. 7,339,137, which is hereby incorporated by reference in its entirety.

BACKGROUND OF THE INVENTION

1. Field of the Invention

The present invention relates to cooking appliances and more particularly pertains to a new electric grilling appliance for cooking food cleanly and effectively with a minimum of smoke generation that permits the use of the appliance in enclosed spaces.

2. Description of the Prior Art

Grilling is a highly desirable way of cooking food as grilling imparts a unique taste and health benefits to the food that are difficult to achieve with other methods of food preparation. However, grilling has traditionally been performed with fire to achieve the desired grilled food flavor, but the use of fire has a number of fairly evident drawbacks, including, but not limited to, the presence of an open flame, the large amount of heat that is generated and creates high temperatures (that is dissipated into the immediate environment), and the smoke that results when juices from the food come into contact with the flame or the heated surfaces of the grill apparatus. These factors can also apply to known electric grilling apparatus, and have made grilling a decidedly warm weather, out-of-doors activity that is limited by the presence of cold weather or precipitation, and for apartment or dormitory dwellers, the lack of an out-of-doors space where a grilling apparatus may be set up.

While some indoor grilling apparatus, such as those sold under the GEORGE FOREMAN trademark, have become popular, these types of grilling apparatus generally have an open character that releases a large amount of heat into the immediate environment of the grilling apparatus and exposes hot surfaces to the user and those around the user during the cooking process. Further, the direct contact between the grilling surfaces and the food being grilled can require a significant amount of clean up. Further, if a number of different food items are being grilled on the grilling apparatus at the same time, the flavors of the food can transfer between the foods, which sometimes is desirable but in many cases is to be avoided.

In these respects, the electric grilling appliance according to the present invention substantially departs from the conventional concepts and designs of the prior art, and in so doing provides an apparatus primarily developed for the purpose of cooking food cleanly and effectively with a minimum of smoke generation that permits the use of the appliance in enclosed spaces.

SUMMARY OF THE INVENTION

In view of the foregoing disadvantages inherent in the known types of known cooking appliances in the prior art, the present invention provides a new electric grilling appliance wherein the same can be utilized for cooking food cleanly and effectively with a minimum of smoke generation that permits the use of the appliance in enclosed spaces.

To attain this, the present invention generally comprises a heating appliance that comprises a chamber portion that defines a heating chamber with an upper opening into the heating chamber, and a perimeter wall that extends about the heating chamber. The appliance also includes a lid portion for selectively closing the upper opening of the chamber portion. A heating apparatus is positioned in the heating chamber for heating the heating chamber. The heating apparatus comprises a heating element positioned in the heating chamber adjacent to the perimeter wall, and a shield positioned above the heating element to block debris from falling on the heating element. The heating element may be mounted on the perimeter wall of the chamber portion, and the shield may be mounted on the perimeter wall of the chamber portion at a location above the heating element. The shield may be sloped downwardly from the perimeter wall toward a center of the heating chamber.

The perimeter wall may include a pair of side walls that are located on opposite sides of the heating chamber, and the heating apparatus may include a pair of heating elements and a pair of shields, with a first one of the heating elements and a first one of the shields being located on an opposite side wall of the chamber portion from a second one of the heating elements and a second one of the shields.

In another aspect of the disclosure, a heating appliance includes a chamber portion defining a heating chamber with an upper opening into the heating chamber, with the chamber portion including a perimeter wall extending about the heating chamber. A heating apparatus is configured to heat air in the heating chamber. A temperature sensor configured to sense an internal temperature of an item located in the heating chamber, and a user interface is configured to receive designation of a desired internal meat temperature and/or desired time of completion of heating of the item from the user. A control circuit is configured to control the supply of power to the heating apparatus, the control circuit being in communication with the temperature sensor to receive a signal from the temperature sensor representing the temperature of the item, and the control circuit is in communication with the user interface to receive a signal from the user interface representing the desired internal meat temperature and/or desired time of completion of heating of the item. The control circuit is configured to control the supply of power to the heating apparatus so that the internal temperature of the item reaches a predetermined temperature at the desired time of completion designated by the user.

In yet another aspect of the disclosure, a heating appliance includes a chamber portion defining a heating chamber with an upper opening into the heating chamber, with the chamber portion including a perimeter wall extending about the heating chamber. A heating apparatus is configured to heat air in the heating chamber. A temperature sensor configured to sense an internal temperature of an item located in the heating chamber, and a user interface is configured to receive designation of a desired internal meat temperature and/or desired time of completion of heating of the item from the user. A control circuit is configured to control the supply of power to the heating apparatus, the control circuit being in communication with the temperature sensor to receive a signal from the temperature sensor representing the temperature of the item, and the control circuit is in communication with the user interface to receive a signal from the user interface representing the desired internal meat temperature and/or desired time of completion of heating of the item. The control circuit is configured to control the supply of power to the heating apparatus so that the internal temperature of the item is maintained at a predetermined temperature for a predetermined period of time before an end of the desired time of completion.

In still yet another aspect of the disclosure, a heating appliance comprises a chamber portion defining a heating chamber with an upper opening into the heating chamber, with the chamber portion including a perimeter wall extending about the heating chamber. A heating apparatus is configured to heat air in the heating chamber. The heating apparatus includes a heating element positioned in the heating chamber adjacent to the perimeter wall, and a shield positioned above the heating element to block debris from falling on the heating element. The perimeter wall of the chamber portion defines a lower portion of the heating chamber and comprises a pair of side walls and a pair of end walls forming a perimeter about the lower portion of the heating chamber. The lid portion of the appliance defines an upper portion of the heating chamber and comprises a top wall, a pair of end walls, and a pair of side walls. The top wall of the lid portion, and the side walls and the end walls of the chamber portion and the lid portion each include a thermally insulating material positioned between outer surfaces of the walls to resist transmission of heat from the heating chamber to an exterior surface of the chamber portion and the lid portion.

In another aspect of the disclosure, a monitoring device comprises a temperature sensor configured to sense an internal temperature of an item located in the heating chamber, and a user interface configured to receive designation of a desired internal temperature or time of completion of heating of the item from the user. A control circuit is in communication with the temperature sensor to receive a signal from the temperature sensor representing the temperature of the item. The control circuit is in communication with the user interface to receive a signal from the user interface representing the desired internal temperature or time of completion of heating of the item. The control circuit is configured to cause the user interface to display certain information. The user interface is configured to display the calculated time for the internal temperature at any given location in the item to reach a predetermined temperature designated by the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the electric grilling appliance of the present invention is the efficiency of the appliance in heating the food item to a desired temperature in a highly controlled manner that does not overheat or burn or dry out the food being cooked. The appliance has the ability to grill food items in a virtually smoke-free manner using a minimal volume of air flow such that the food is efficiently heated with a minimal loss of heat to the environment of the appliance, but also with minimal drying of the food due to excess air flow. Further, smoking of the food being cooked is facilitated by a smoking material holding tray located near the heating elements.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
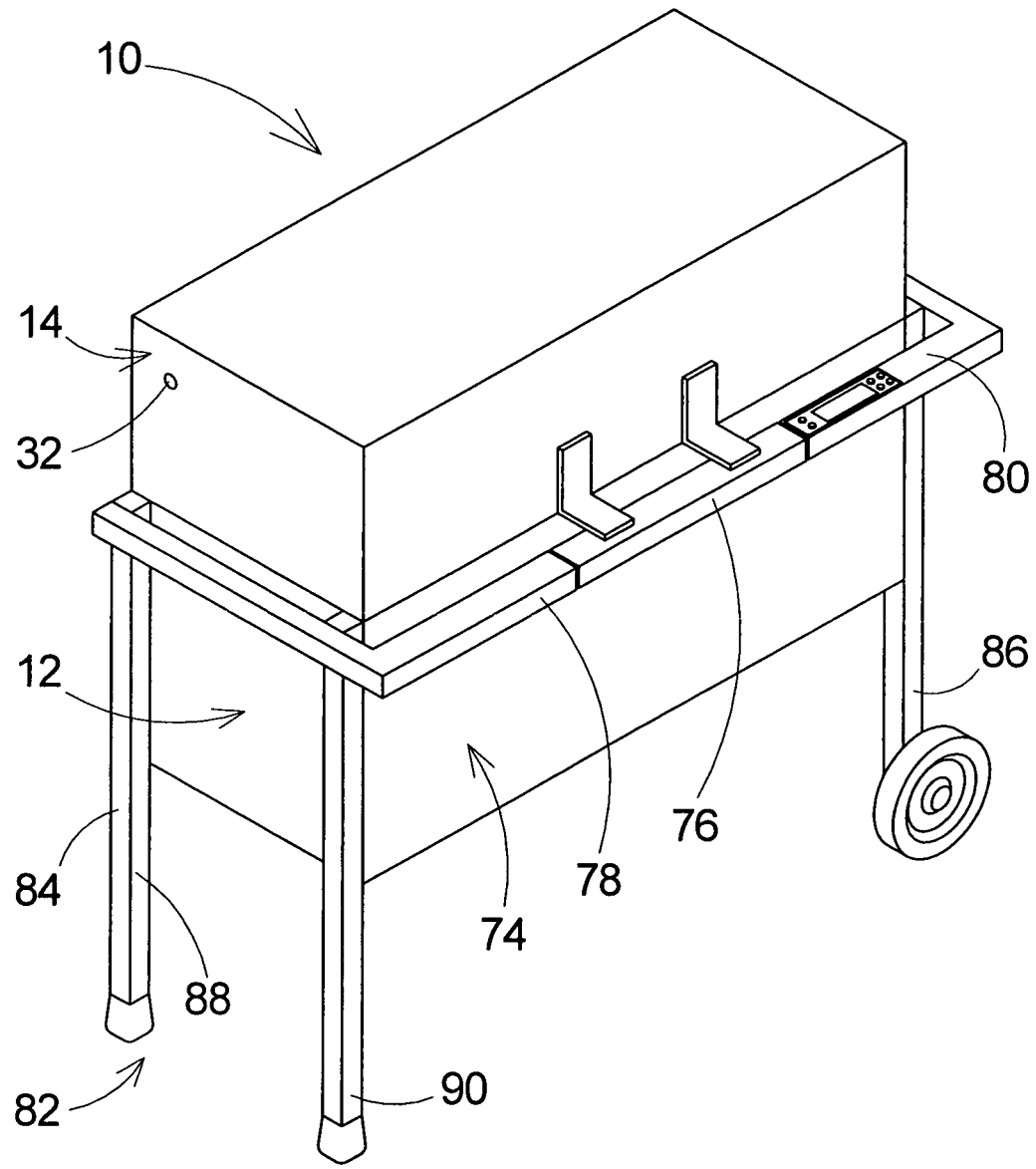
FIG. 1 is a schematic perspective view of the new electric grilling appliance according to the present invention.
Figure 2:
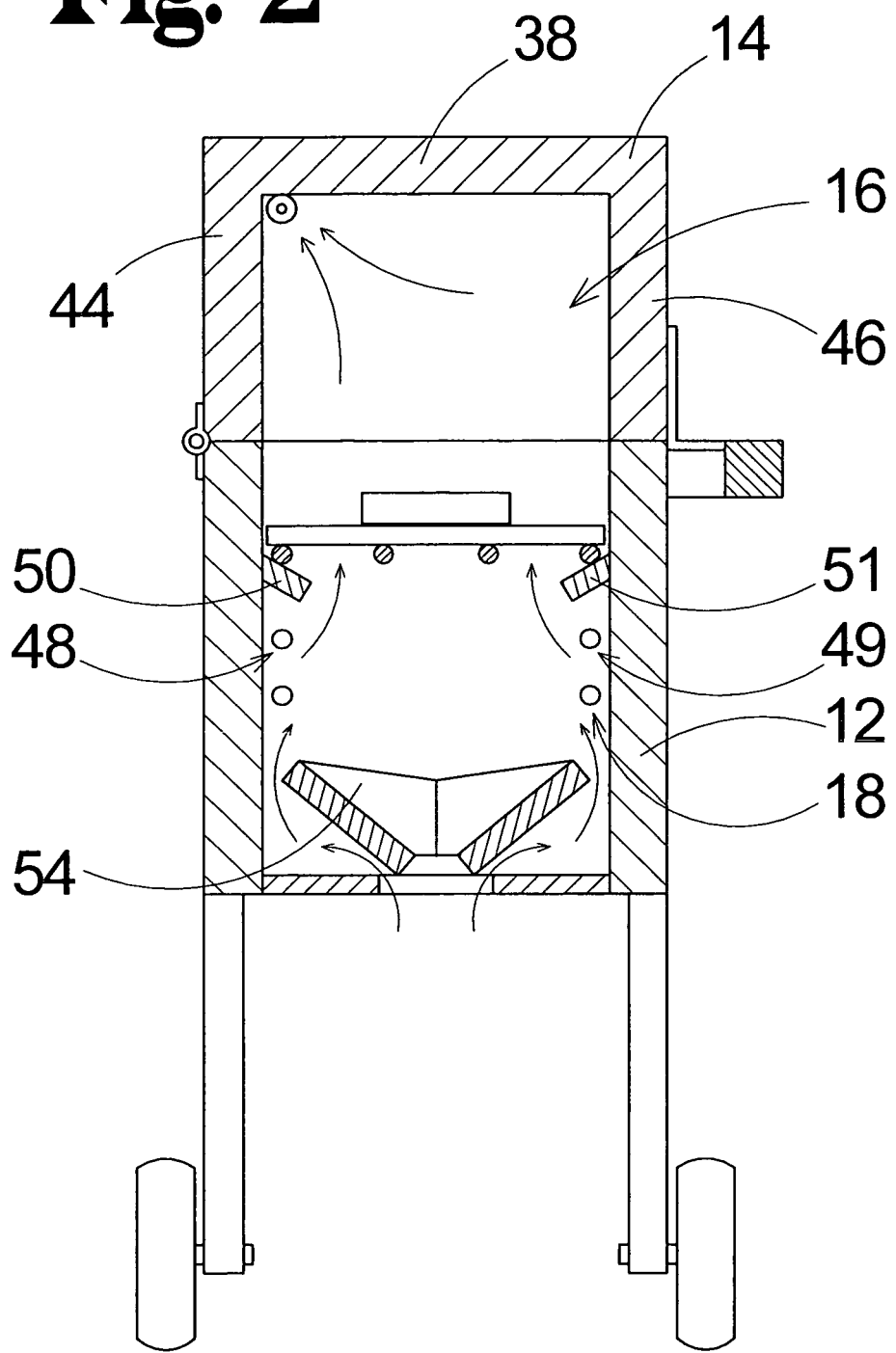
FIG. 2 is a schematic transverse sectional view of the present invention with the lid portion in a closed condition.
Figure 3:
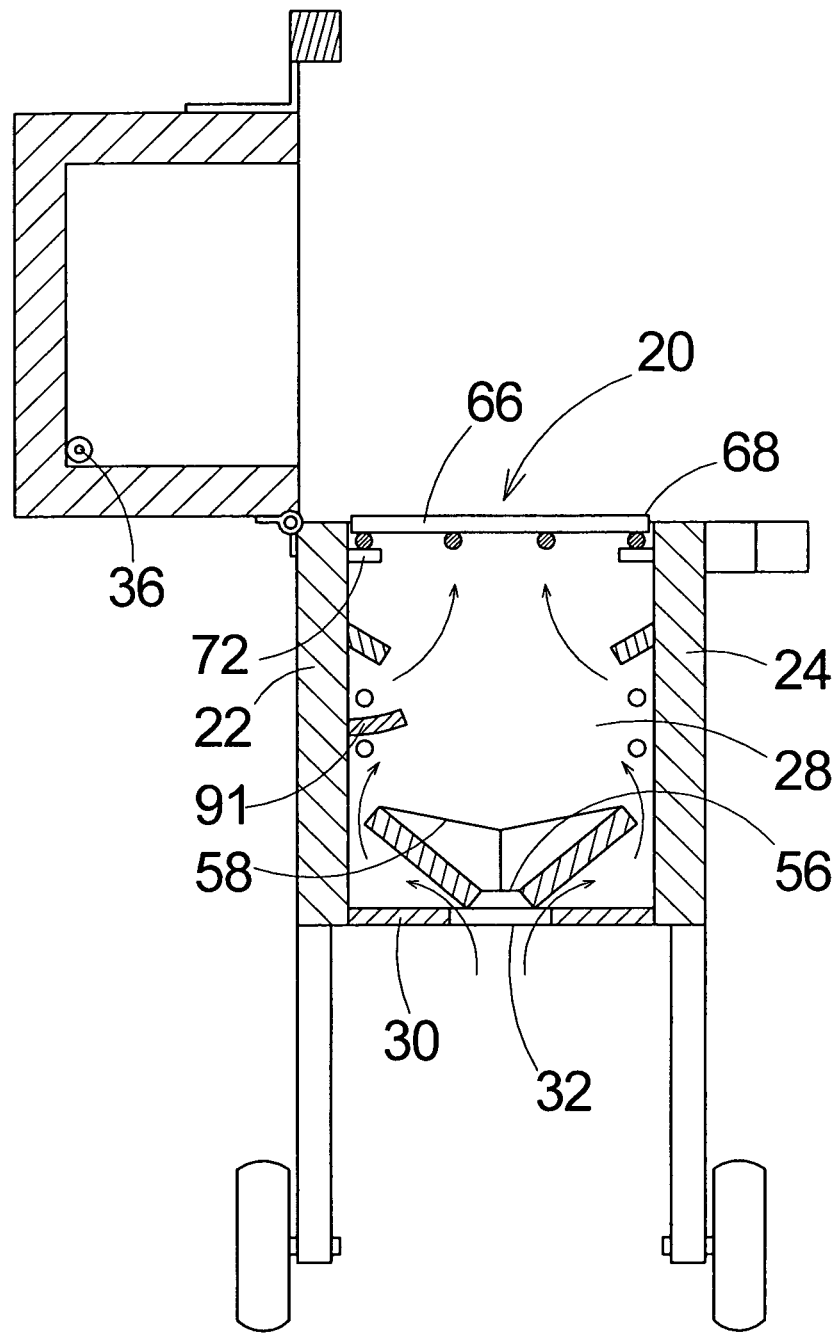
FIG. 3 is a schematic transverse sectional view of the present invention with the lid portion in an open condition.
Figure 4:
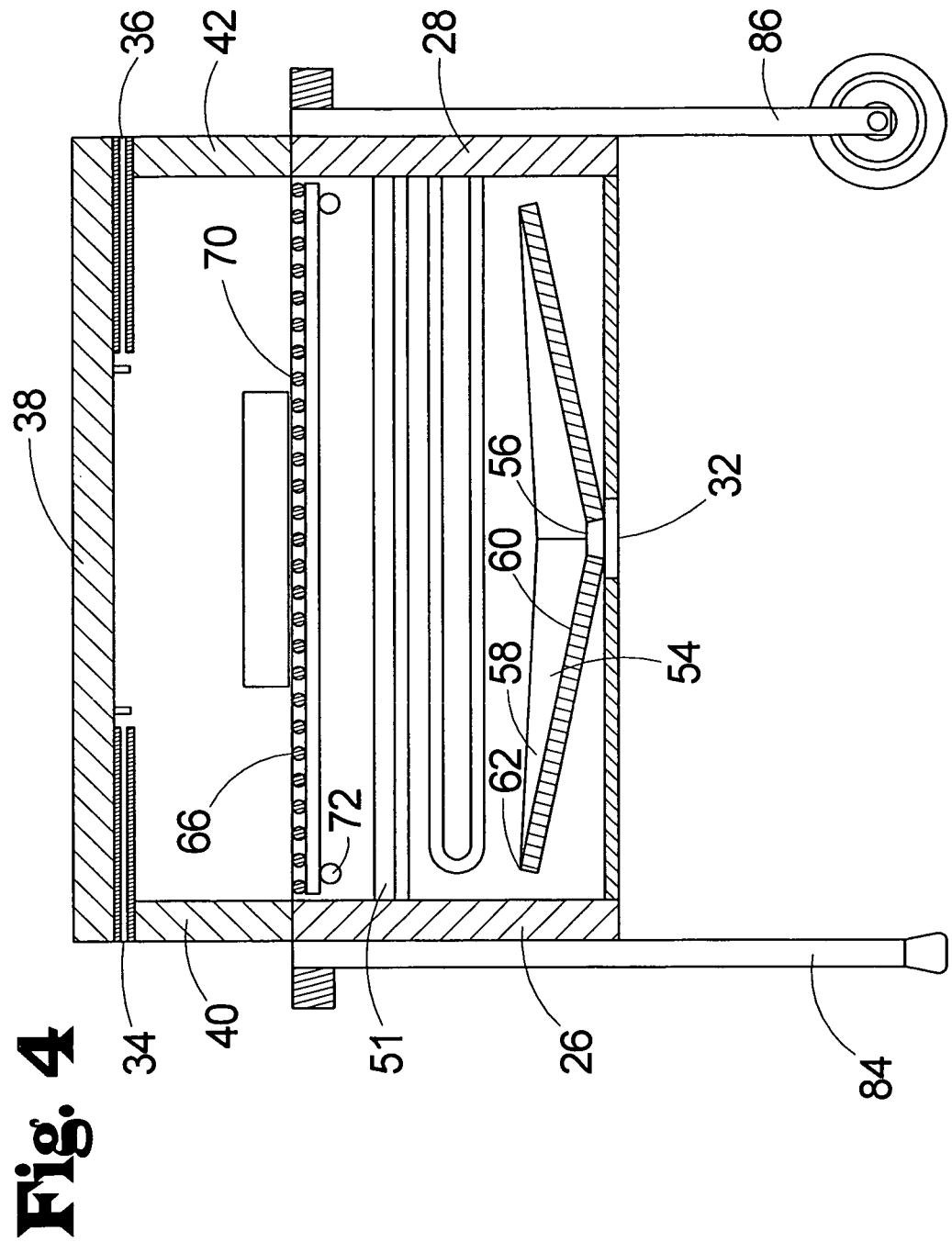
FIG. 4 is a schematic longitudinal sectional view of the present invention.
Figure 5:
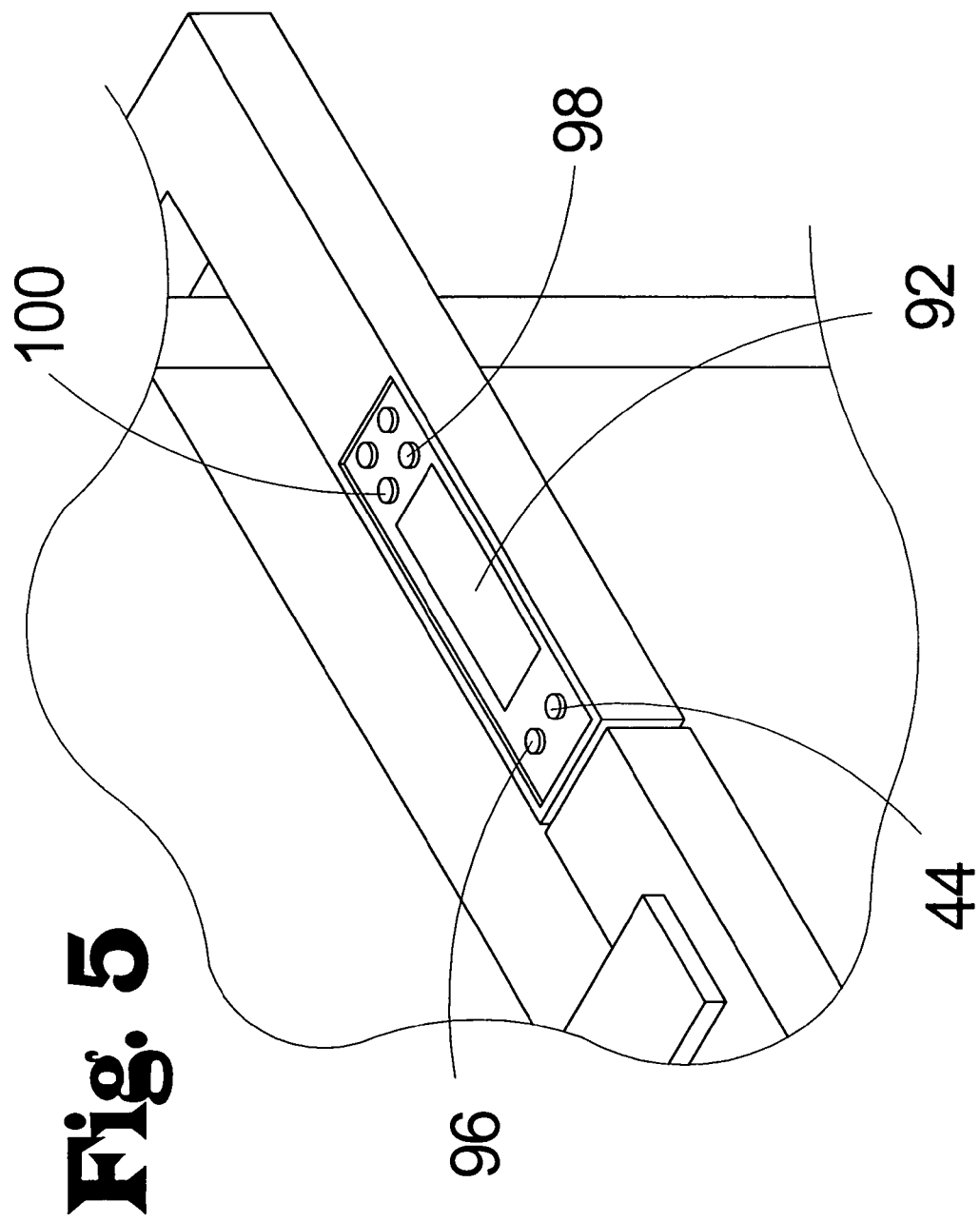
FIG. 5 is a schematic top view of the controls of the present invention.
Figure 6:
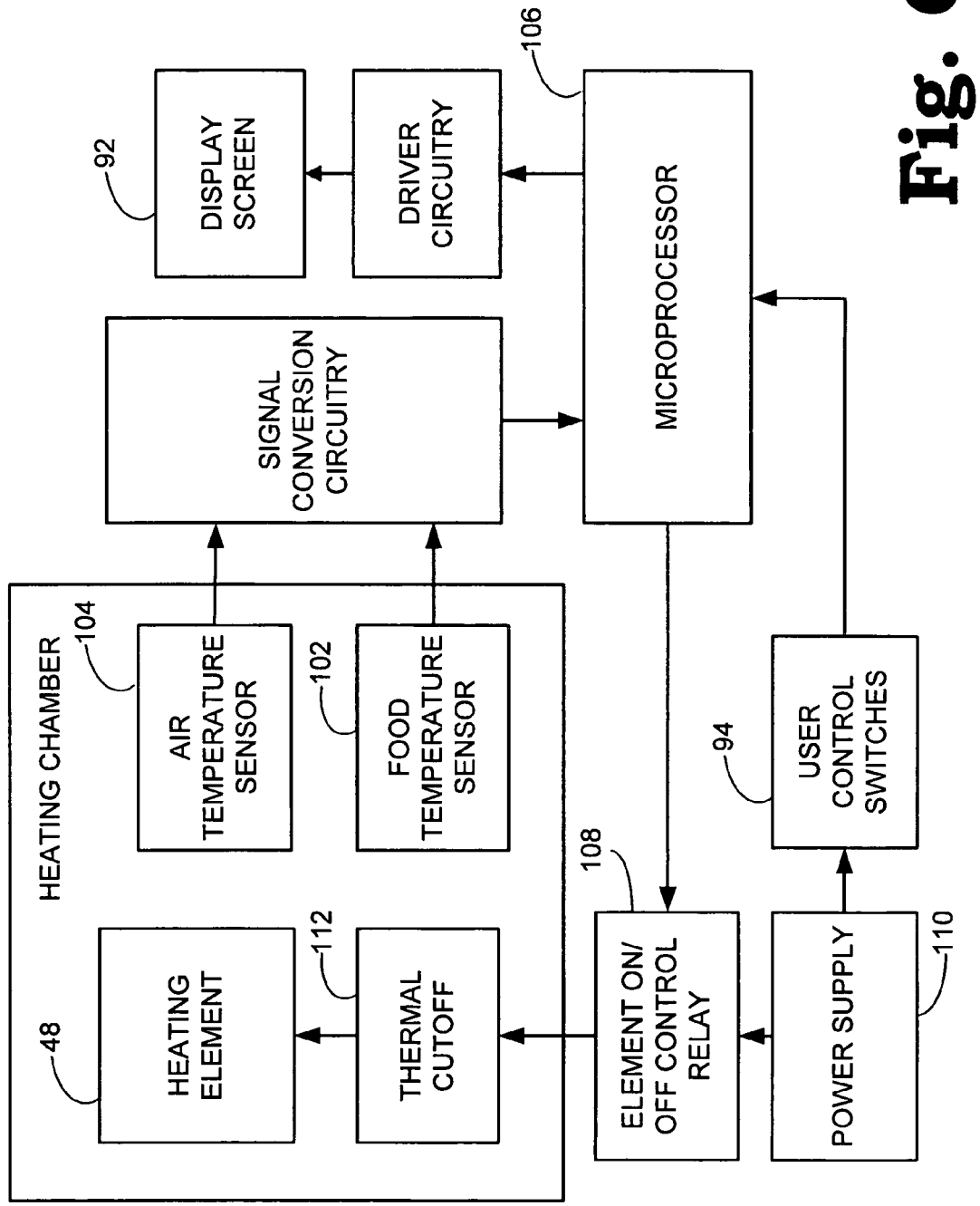
FIG. 6 is a schematic diagram of control circuitry of the present invention.

With reference now to the drawings, and in particular to FIGS. 1 through 12 thereof, a new electric grilling appliance embodying the principles and concepts of the present invention and generally designated by the reference numeral 10 will be described.

As illustratively shown in FIGS. 1 through 5, the food heating and grilling appliance 10 of the invention generally includes a chamber portion 12 and a lid portion 14 that define a heating chamber 16 for receiving an item of food to be heated, in which a heating apparatus 18 is positioned.

The chamber portion 12 defines a lower section of the heating chamber 16, and has an upper opening 20 that opens into the heating chamber 16. In the illustrative embodiment of the invention, the chamber portion 12 may comprise a perimeter wall 22 that defines the upper opening 20 and extends about the heating chamber 16. The perimeter wall 22 comprises a pair of side walls 24, 26, and a pair of end walls 28, 30. The walls 22, 24, 26, and 28 of the chamber portion 12 may be configured into a substantially rectangular cross sectional shape, although other configurations may be employed. The side walls 24, 26 and end walls 26, 28 may be comprised of a thermally insulating material positioned between panels of a more durable material, such as a metal. The use of the insulating material in the walls provides the benefits of keeping much of the exterior surface of the chamber portion and the lid portion relatively cool, and also permits a common household power level (for example approximately 120 volts and approximately 15 amps) to create sufficient heat in the heating chamber to cook the food in the heating chamber. Further, the use of the insulating material is believed to permit a larger cooking area to be heated using the preferred heating apparatus 18.

The chamber portion 12 may also comprise a bottom wall 30 that extends below the heating chamber 16, and may extend between the sections of the perimeter wall 22. The bottom wall 30 may have an aperture 32 for permitting air to flow into the heating chamber 16 from below the chamber portion 12. The aperture 32 may be substantially centrally located on the bottom wall 30 of the chamber portion 12. Optionally, the bottom wall 30 may lack the insulation of the other walls of the chamber portion 12.

The lid portion 14 of the appliance 10 functions to selectively open and close the upper opening 20 of the chamber portion 12. The lid portion 14 may be pivotally mounted on the chamber portion 12 for movement between an open position in which the upper opening is open, and a closed position in which the upper opening is closed. The lid portion 14 may define an upper portion of the heating chamber 16. The lid portion 14 may comprise a top wall 38, a pair of end walls 40, 42, and a pair of side walls 44, 46, and preferably these walls are insulated similar to the walls of the chamber portion 12. Optionally, a gasket (not shown) may be positioned between the respective walls of the chamber portion 12 and the lid portion 14 when the lid portion 14 is closed on the chamber portion.

At least one vent 34, and illustratively two vents 34 and 36, are provided to permit a limited quantity of air to pass through the lid portion 14 to the exterior of the appliance 10. The escaping air is replaced by air coming through the aperture 32 in the bottom wall 30 of the chamber portion 12. The vents 34, 36 extend through the lid portion 14 between the heating chamber 16 and an exterior surface of the lid portion 14. Preferably, but not critically, the vents 34, 36 are located in the ends walls 40, 42 of the lid portion 14, and the interior entrances to the vents are located toward the center of the side walls 44, 46 of the lid portion to promote a more central air flow through the heating chamber 16. The vents 34, 36 may be formed of a tube that extends through the wall of the lid portion 14 and extends into the interior of the heating chamber 16. Optionally, a shield may be positioned adjacent to the inner entrances of the vents to further reduce or constrict the opening and minimize air flow through the vent. As a further preferred structure, the area of the opening of the vents 34, 36 is relatively small in comparison to the cross sectional area of the heating chamber in a plane in which the food is supported (e.g., a plane in which the grill extends). For example, each of the vents 34, 36 may have a combined area of approximately one square inch (approximately 6.5 square cm) or less.

The heating apparatus 18 is positioned in the heating chamber 16 for the function of heating air in the heating chamber. In the illustrative embodiment of the invention, the heating apparatus 18 includes a heating element 48 that is positioned in the heating chamber, and most preferably is positioned adjacent to the perimeter wall 22 of the chamber portion 12. The heating element 18 may be mounted on the perimeter wall 22 of the chamber portion 12, and may be mounted on one of the side walls 24, 26 of the perimeter wall. In the most preferred embodiments of the invention, the heating element 48 comprises an electrical heating element, although it is possible that heating elements utilizing other fuel sources, such as a flammable gas or even wood, might be used.

The heating apparatus 18 may also comprise a shield 50 that is positioned above the heating element 48 to block debris from falling on the heating element to avoid the creation of smoke when the debris strikes the hot surface of the heating element 18. The shield 50 may be mounted on the perimeter wall 22 of the chamber portion 12, such as on one of the side walls 24, 26 of the perimeter wall 22. The shield 50 may be sloped downwardly from the perimeter wall 22 toward a center of the heating chamber 16. In the most preferred embodiments of the invention, the heating apparatus 18 includes a pair of heating elements 48, 49 and a pair of shields 50, 51, with a first one 48 of the heating elements and a first one 50 of the shields being located on a side wall 24 of the chamber portion 12 that is opposite of a second one 49 of the heating elements and a second one 51 of the shields.

The appliance 10 may also include a drip collection tray 54 that is positioned in the heating chamber 16, and may be removable from the heating chamber for ease of cleaning, if needed. Preferably the tray 54 is positioned low in the heating chamber 16 and below the heating apparatus 18, which facilitates keeping the temperature of the drip collection tray 54 relatively lower than if the tray were positioned higher up in the heating chamber 16 and thus reduces the possibility of smoke being generated if drippings from the food being cooked strikes the tray 54. The smoke may carry irritants that are annoying and carcinogens that are dangerous. In at least some embodiments of the invention the drip collection tray 54 is positioned above and adjacent to the bottom wall 30, and may rest on the bottom wall. The drip collection tray 54 may have a central hole 56 that is positioned above the aperture 32 in the bottom wall 30. The drip collection tray 54 may have a perimeter region 58 that surrounds a central region 60 of the tray 54. The central region 60 may be at a relatively lower vertical level than the perimeter region 58 to cause debris to move toward the central hole 56 in the central region 60. The drip collection tray 54 may have a perimeter edge 62, and the perimeter edge 62 may be positioned adjacent to the perimeter wall 22 of the chamber portion 12. The perimeter edge 62 may be spaced from the perimeter wall 22 a small distance (e.g., less than approximately 0.5 inches (approximately 1.25 cm)) to permit air to move between the perimeter edge 62 and the perimeter wall 22.

The combination of the aperture 32 in the bottom wall 30 and the spacing between the perimeter edge 62 of the tray 54 and the interior walls of the heating chamber 16 permits a flow of make up air (for the air leaving the vents 34, 36) to enter the heating chamber 16. As the make up air flows about the drip collection tray 54, heat from the tray 54 is absorbed by the entering air, which functions to cool the tray 54 and preheat the incoming air. The relatively small size of the vents 34, 36 controls the volume of air that can move into the heating chamber 16, which minimize the flow of air into the chamber and minimizes the drying effect of the air movement on the food being cooked.

A grill assembly 64 may be included in the appliance 10 of the invention for supporting items of food in the heating chamber 16. The grill assembly 64 may comprise a grill 66 having an outer perimeter frame 68 defining a central opening and a plurality of bars 70 that extend across the central opening of the perimeter frame. The grill assembly may also include means for removably mounting the grill in the heating chamber, which may be located on the chamber portion 12 of the appliance 10. Preferably, the grill mounting means is configured to support the grill at two different vertical levels in the heating chamber. In one embodiment of the invention, the grill mounting means comprises an upper support assembly which includes a plurality of pegs 72. Each of the pegs 72 may be mounted on the perimeter wall 22 of the chamber portion 12 and may extend inwardly into the heating chamber 16. Significantly, the shield 50 of the heating apparatus 18 may form a lower support for supporting the grill in a relatively lower vertical position than the pegs 72 of the upper support assembly. Thus, the upper support assembly is located at a greater distance from the heating element 18 than the lower support formed by the shield. The adjustment in the vertical height of the grill 66 permits the accommodation of relatively larger food items in the heating chamber 16.

The appliance may also include a handle assembly 74. The handle assembly 74 may include at least two segments. The handle assembly may include a lid handle segment 76 that is mounted on the lid portion 14, and may extend in a forward direction from the lid portion 14. The handle assembly 74 may also include a pair of chamber handle segments 78, 80 that are each mounted on the chamber portion 12. The pair of chamber handle segments 78, 80 may each be mounted on one of the end walls 28, 30 of the chamber portion 12. In the illustrative embodiment of the invention, the lid handle segment 76 is positioned between the pair of chamber handle segments 78, 80 when the lid portion 14 is in the closed position.

A leg assembly 82 may be removably mounted on the chamber portion 12 of the appliance 10 for supporting the chamber portion 12 above a surface, such as the ground or a floor. The leg assembly 82 may include a pair of leg sets 84, 86. Each of the leg sets 84, 86 may be mounted on one of the end walls 28, 30 of the chamber portion 12. Each of the legs sets 84, 86 may comprise a pair of legs 88, 90, and the pair of legs may be mounted on one of the chamber handle segments 78, 80. Optionally, the leg assembly 82 may removable from the chamber portion 12 to facilitate transport and storage, or placement of the chamber portion 12 on a raised support surface such as a countertop.

As an option, the food grilling appliance 10 may include a smoking material holding tray 91 that may be removable from the heating chamber 16. The smoking material holding tray 91 may be positioned adjacent to at least one of the heating elements 48, 49 for holding a suitable smoking material, such as wood chips, in a manner so that the smoking material can be heated by the heating elements. In one preferred embodiment, the holding tray 91 is positioned below at least a portion of the heating element 48, and may be positioned between two sections of the heating element 48, although other positions proximate to the heating elements may also be used. The holding tray 91 preferably does not touch the heating element 48. The smoking material holding tray 91 of the invention creates smoke for imparting a smoked flavor to the food being cooked. The restricted air flow through the heating chamber 16 is believed to suppress any burning of the smoking material without having to soak the smoking material prior to placing the material in the holding tray 91.

As illustratively shown in FIGS. 6 through 10, the invention includes means for controlling the supply of power to the heating apparatus 18 that may be responsive to the temperature of the air in the heating chamber 16, but also to the internal temperature of the food being cooked, so that the food may be heated to the desired temperature without greatly exceeding that desired temperature since the internal temperature of the food item is different from the air temperature in the heating chamber 16. The means for controlling the supply of power to the heating apparatus may thus include a user interface assembly that includes a display screen 92 and a plurality of control switches or buttons 94, 96, 98, and 100. Illustratively, the control assembly is integrated into the handle assembly 74 for convenient access. The control means may also include means for detecting temperature within the heating chamber 16, including a temperature transducer or probe 102 that is removably insertable into an item of food located in the heating chamber in order to contact the interior of the food item and be able to sense and detect that temperature. Optionally, the temperature detection means may also include an air temperature sensor 104 for additionally detecting the temperature of the air inside the heating chamber 16. The signals from the sensors 102, 104 are processed as needed and directed to a microprocessor 106. The microprocessor 106 receives input from the user control switches 94-100 and outputs data to the display 92, and also communicates through suitable circuitry to a relay 108 that controls the supply of electrical power to the heating elements 48, 49 from a power supply or source 110. Optionally, thermal cutoff circuitry 112 may be included to directly shutoff the supply of power to the heating elements 48, 49 if a predetermined temperature is exceeded in the heating chamber 16 (should, for example, the power control circuitry fail) as a safety measure.

The means for controlling the heating of the heating elements of the invention permits the heating apparatus to not only cook the food, but also to warm (or maintain an intermediate temperature of) the food after it has been cooked. The cooking of the food can also be conducted in a predictive manner, through the use of the probe 102 and the processor 106.

Figure 7:
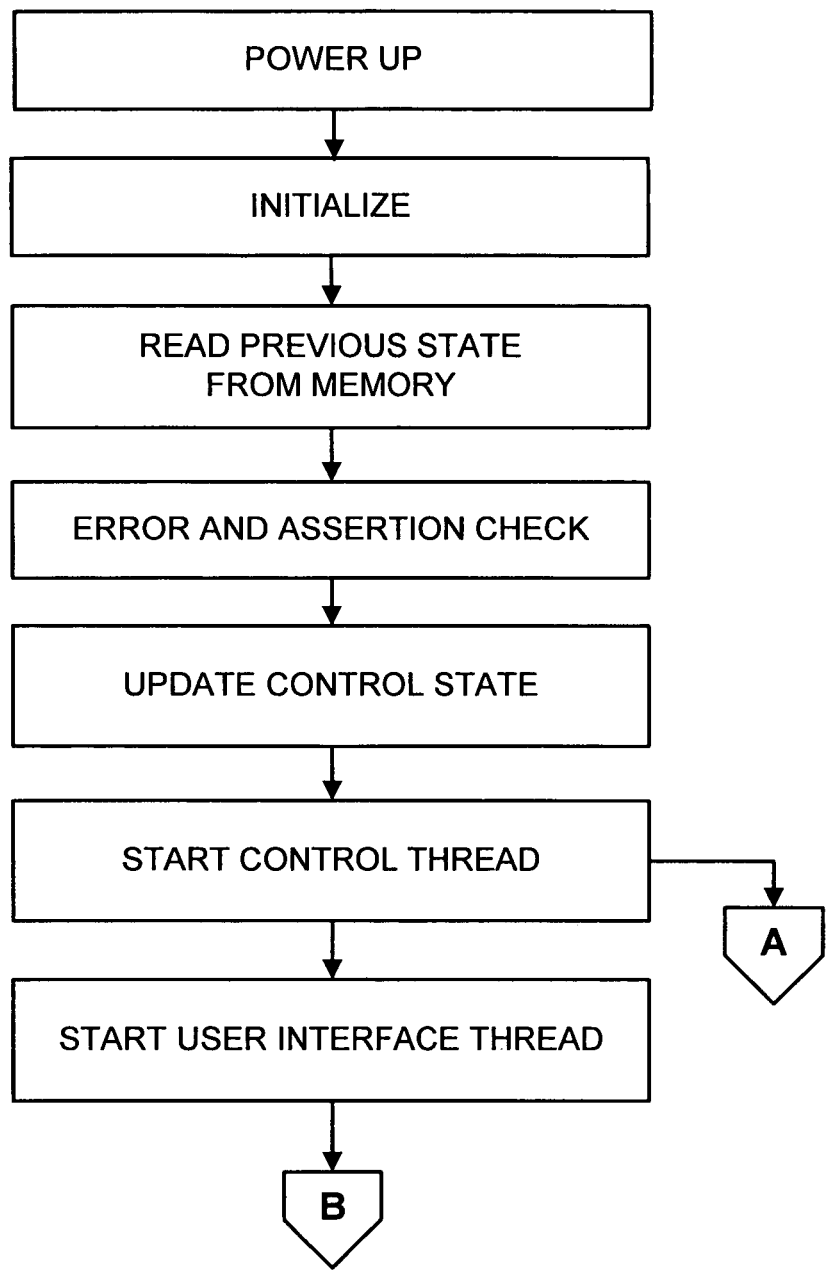
FIG. 7 is a schematic flowchart of an initial control thread of the present invention.

FIG. 7 of the drawings shows an illustrative initializing process for the invention that may be executed at initial power up of the electric grilling apparatus 10 of the invention, and which may initiate the operation of various control threads by the microprocessor.

Figure 8:
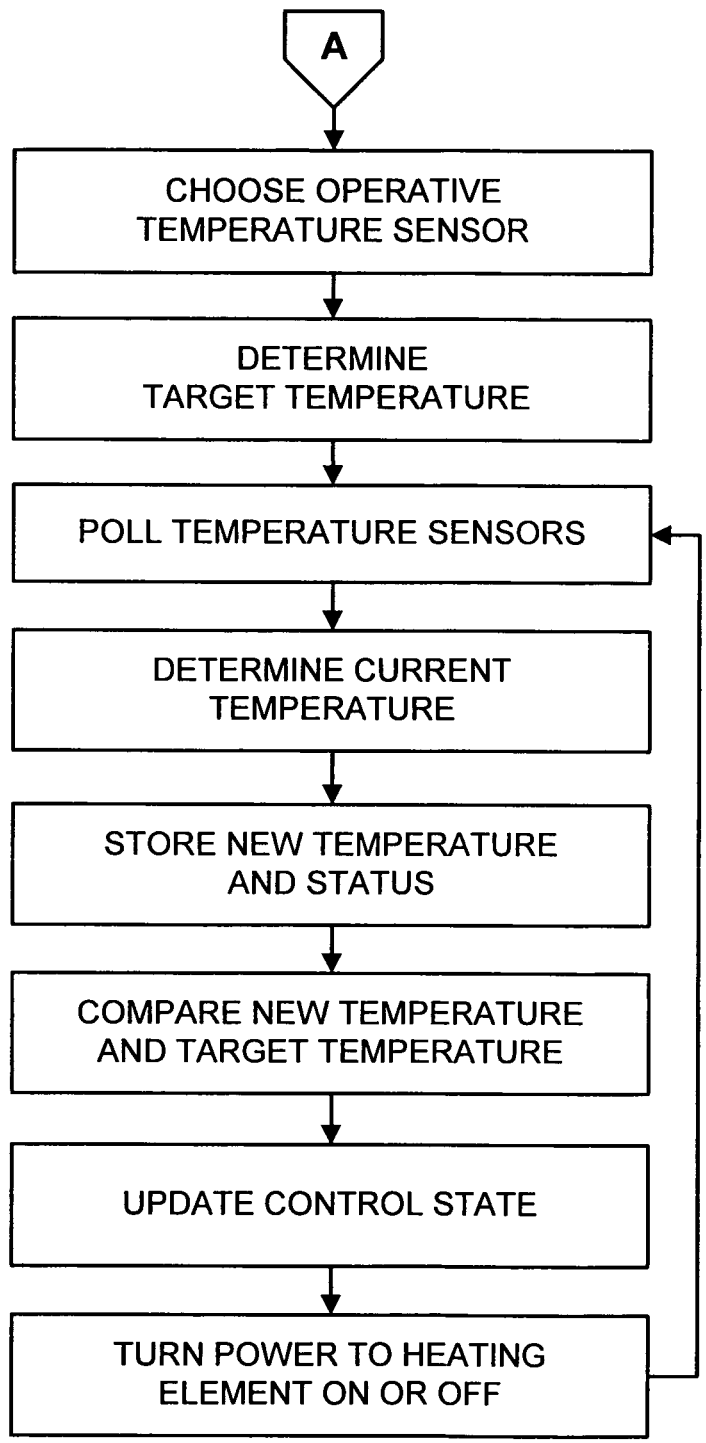
FIG. 8 is a schematic flowchart of a main control thread of the present invention.

FIG. 8 of the drawings shows an illustrative control process of the invention that may be executed after an initializing process has been executed at initial power up, and which monitors the target or desired temperature of the food and the current temperature of the food (or the air in the heating chamber) and adjusts the supply of power to the heating elements 48, 49 on a periodic basis to achieve the target temperature of the heating chamber or in the food being cooked.

Figure 9:
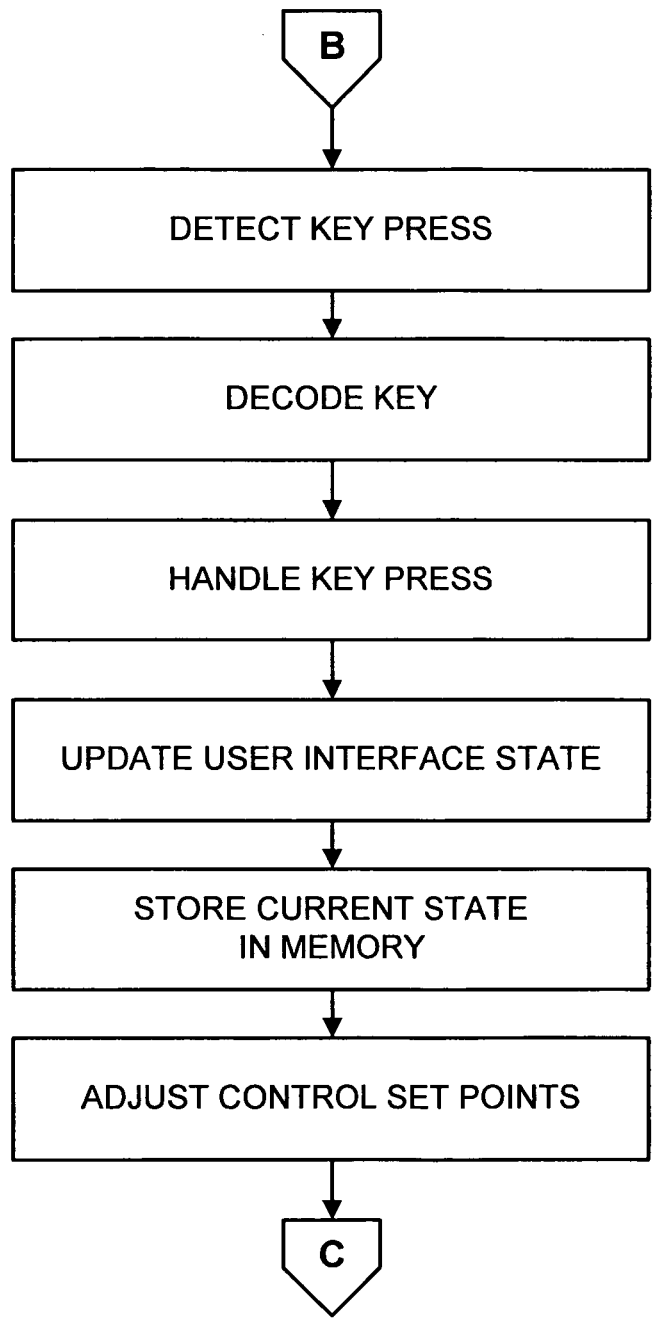
FIG. 9 is a schematic flowchart of a user interface control thread of the present invention.

FIG. 9 of the drawings shows an illustrative process for monitoring and administering the user controls, such as switches 94 through 100, and user commands entered by the user through the controls.

Figure 10:
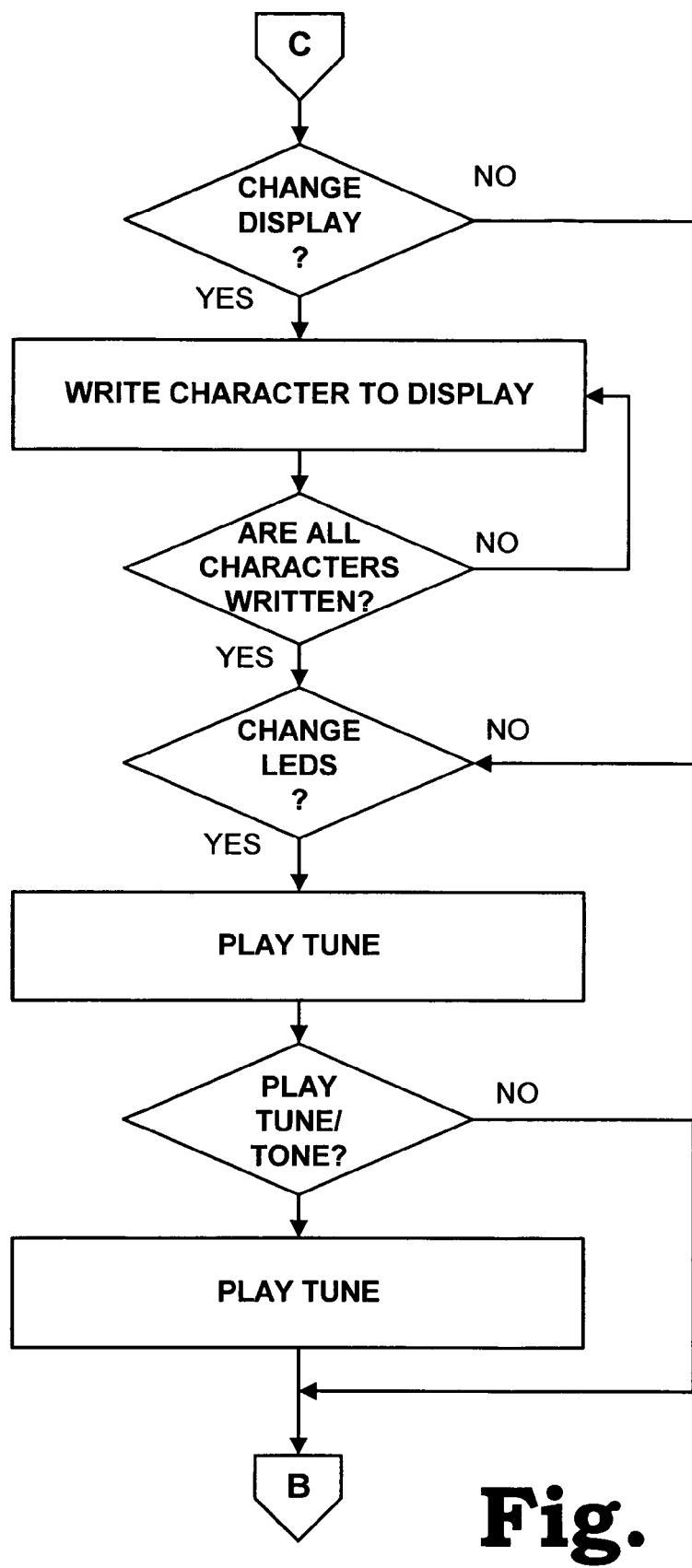
FIG. 10 is a schematic flowchart of a further portion of the user interface control thread of the present invention.
Figure 11:
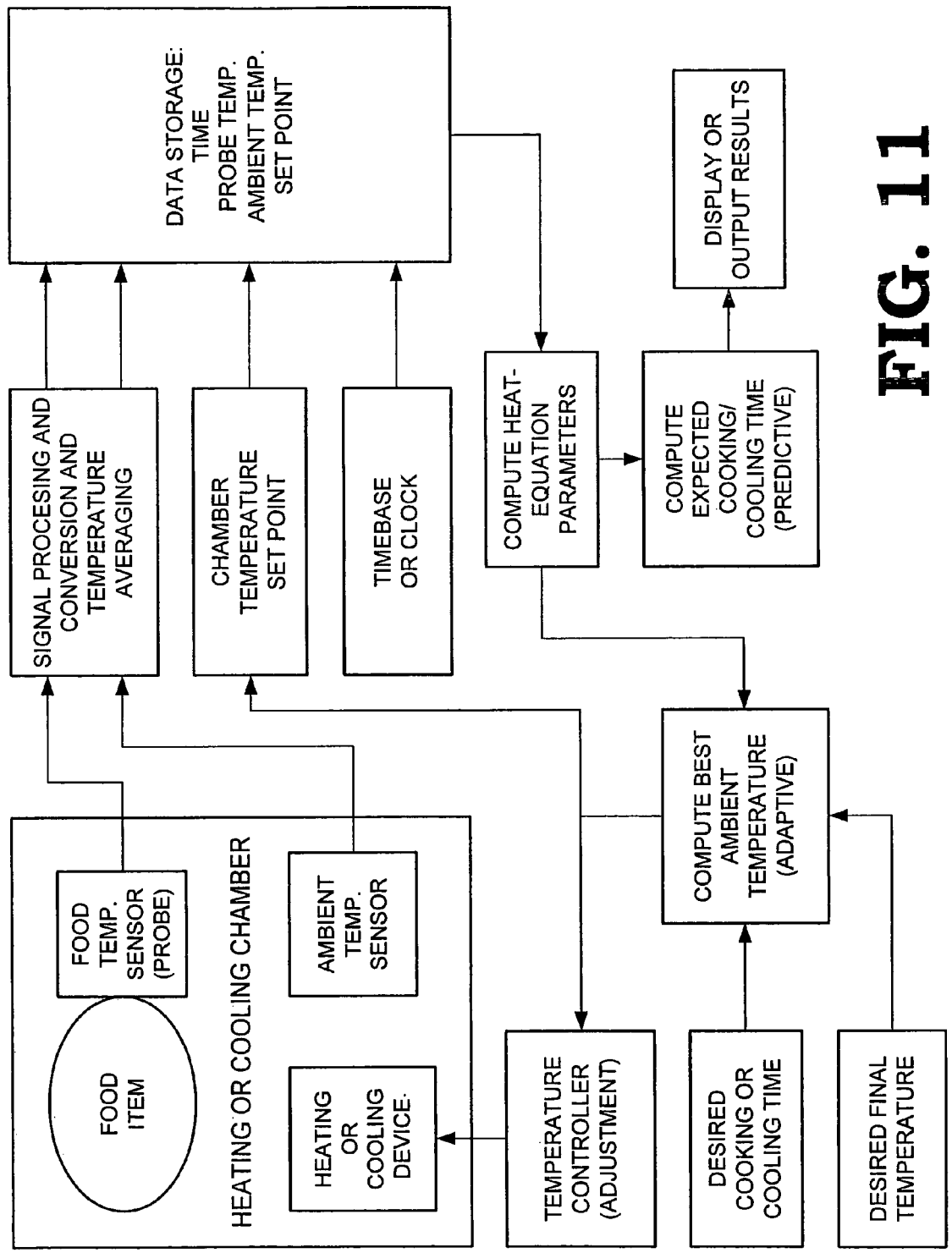
FIG. 11 is a schematic block diagram of a control system suitable for the grilling appliance of the present disclosure.

FIG. 10 of the drawings shows an illustrative process for controlling an output means, such as display screen 92, for conveying information to the user. An optional audible signaling means my also be controlled for signaling the user in an audible, and non-visual manner.

The microprocessor 106 may execute a software control program that executes the processes disclosed above and in the drawings, and may also execute several additional optional processes that provide additional operational features. These additional operational features include, but are not necessarily limited to, heating the food item only until a target temperature is reached by an internal portion of the food item. Another operational feature that the invention may include is requiring a constant actuation of the on power button (and optionally the off power button) for a predetermined period of time in order to either turn the power on or off (and otherwise ignoring the power on or off command). Still another operational feature that the invention may include is shutting off the power to the heating elements after a predetermined maximum period of time (such as, for example, five hours). The invention may include an operational feature that requires that the user make certain selections from a user menu before power is supplied to the heating elements (and not automatically supplying power to the heating elements at power on). Further, an operational feature that the invention may include the ability to resume a previous, interrupted cooking process or program that is interrupted, for example, by a loss of power to the grilling appliance 10, when the power is again supplied to the appliance or when the user initiates the resumption of power. In some implementations of this optional operational feature, the previous cooking process may not be resumed if a predetermined maximum period of time is exceeded (such as, for example, after 30 minutes or an hour). Also, when provided a desired time period for cooking the food item, the invention may heat the food item at a rate calculated to reach the desired or target temperature at the end of the time period. The invention may be suitably programmed to indicate the time for reaching the target temperature by the food item based upon the initial portion of the heating process and the heating rate observed in that initial heating of the food item. The invention may also be configured to sense if the food temperature probe is currently connected or disconnected. The invention may further include means for detecting a short circuit, and may be implemented through the detection of a non-zero potential between the housing and the neutral power lead.

In actuating the buttons of the control, a protocol may be established, such as for the "power on" and "power off" commands that requires the buttons to be actuated for a minimum amount of time for the command to be effective. For example, the user may be required to hold the "on power" button down for a minimum amount of time of 3 seconds for the command to be executed and the power actually supplied to the components of the control apparatus. Further, the "on power" command may not automatically cause power to be supplied to the heating apparatus 18, but the user may be required to take certain additional steps to cause the heating apparatus to be supplied with power, such as negotiating through a menu.

Optionally, the temperature transducer sensors 102, 104 may communicate with the power controlling circuitry through means other than wires, e.g., wirelessly. As a further option, a rotisserie (not shown) may also be employed in the appliance 10 of the invention, and a transparent window may be incorporated into the lid portion 14.

In some more preferred embodiments of the invention, the size of the aperture 32 in the bottom wall 30 is greater than the size of the central hole 56 in the drip collection tray 54 to facilitate air flow through the aperture 32 and below the drip collection tray 54 and around the perimeter edge 62 of the drip collection tray 54.

It should be recognized that the application of the control system is not limited to apparatus employing the chamber portion and lid portion, and may comprise a food monitoring device that includes the food temperature sensor that is configured to sense an internal temperature of a food item located in the heating chamber. The food monitoring device may include a user interface that is configured to receive designation of a desired internal temperature and/or time of completion of heating of the food item from the user. The user interface may be further configured to display the calculated time for the internal temperature at any given location in the food item to reach a predetermined temperature designated by the user. The food monitoring device may further include a control circuit being in communication with the food temperature sensor to receive a signal from the food temperature sensor representing the temperature of the food item. The control circuit, which is described in greater detail elsewhere herein, is in communication with the user interface to receive a signal from the user interface representing the desired internal temperature and/or time of completion of heating of the food item, and may cause the user interface to display certain information.

The user interface may be further configured to display additional information about the cooking process, such as, for example, the maximum temperature the food item has reached, the length of time since the food item finished cooking, and the length of time in which the food item was cooked.

In some embodiments, the temperature probe may include two (or more) sensors, with a first sensor being located at the tip of the probe for sensing an internal temperature of the food item when the probe is inserted into the food item, and a second sensor at a location on the probe separated from the first sensor that is configured to sense an ambient temperature or the temperature of the air in the heating chamber. Both sensors may be in communication with the control circuit.

The appliance may include a control system that permits adaptive cooking (by heating) or even cooling (if the appliance is suitably equipped) that heats or cools the food item at a rate that is suitable to bring the food item temperature to a suitable level at the end of a desired period, such as at a set time chosen by a user through, for example, a user interface. The control system may also permit ambient cooking that heats or cools the food item at a rate that is suitable to bring the food item temperature to a desired level at the end of a period, such as at a set time, based upon a current temperature of the food item.

The control system also supports predictive cooking (by heating) or even cooling (again if the appliance is suitably equipped) that is able to predict or provide an estimate of the time that it will take for the food item to reach the desired temperature based upon the current temperature of the air in the heating chamber, and display that temperature to the user through the display of the user interface.

Figure 12A:
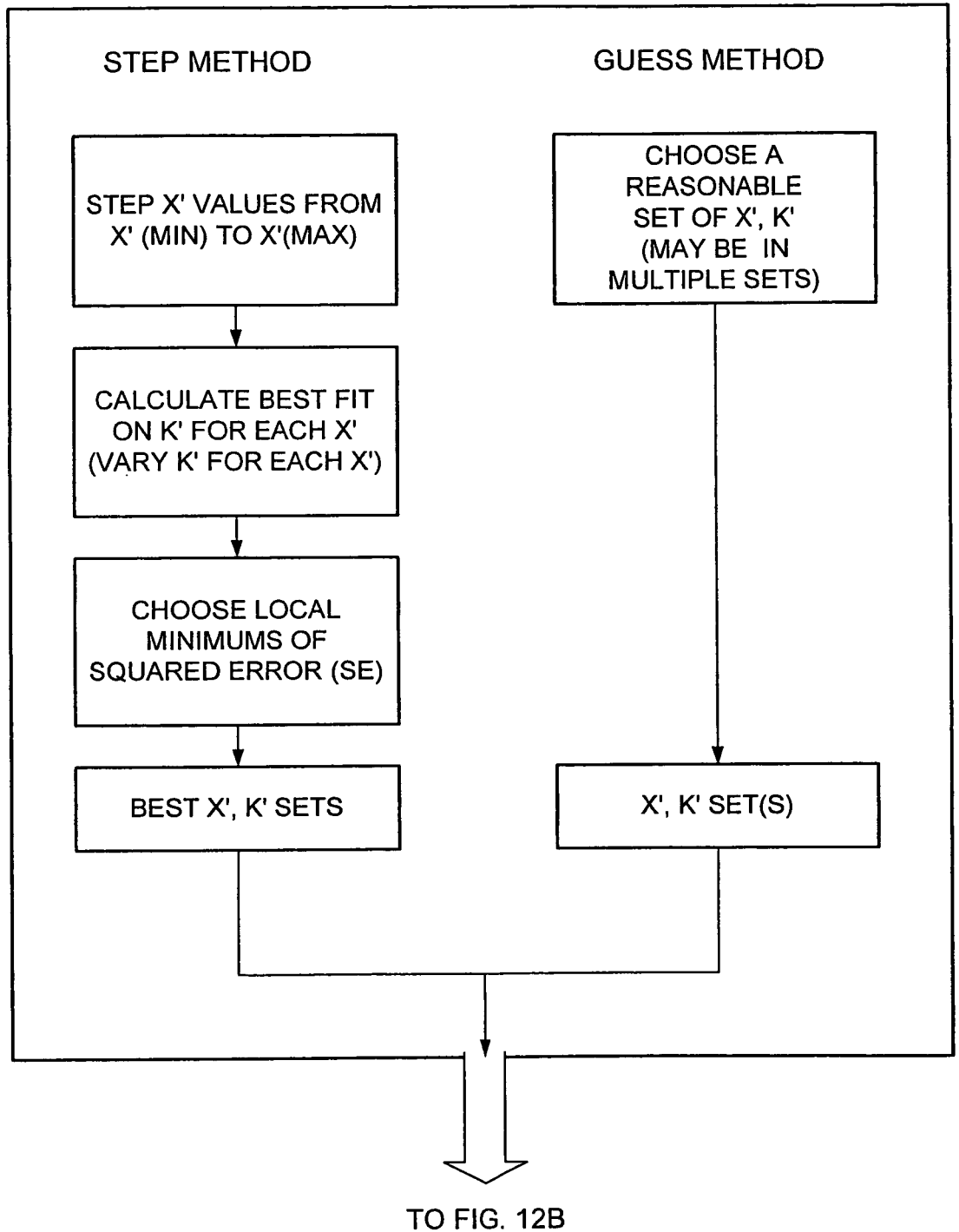
FIG. 12A is the first portion of a schematic flowchart of a process for calculating heat-equation parameters for controlling the heating apparatus to achieve a desired cooking or cooling time.
Figure 12B:
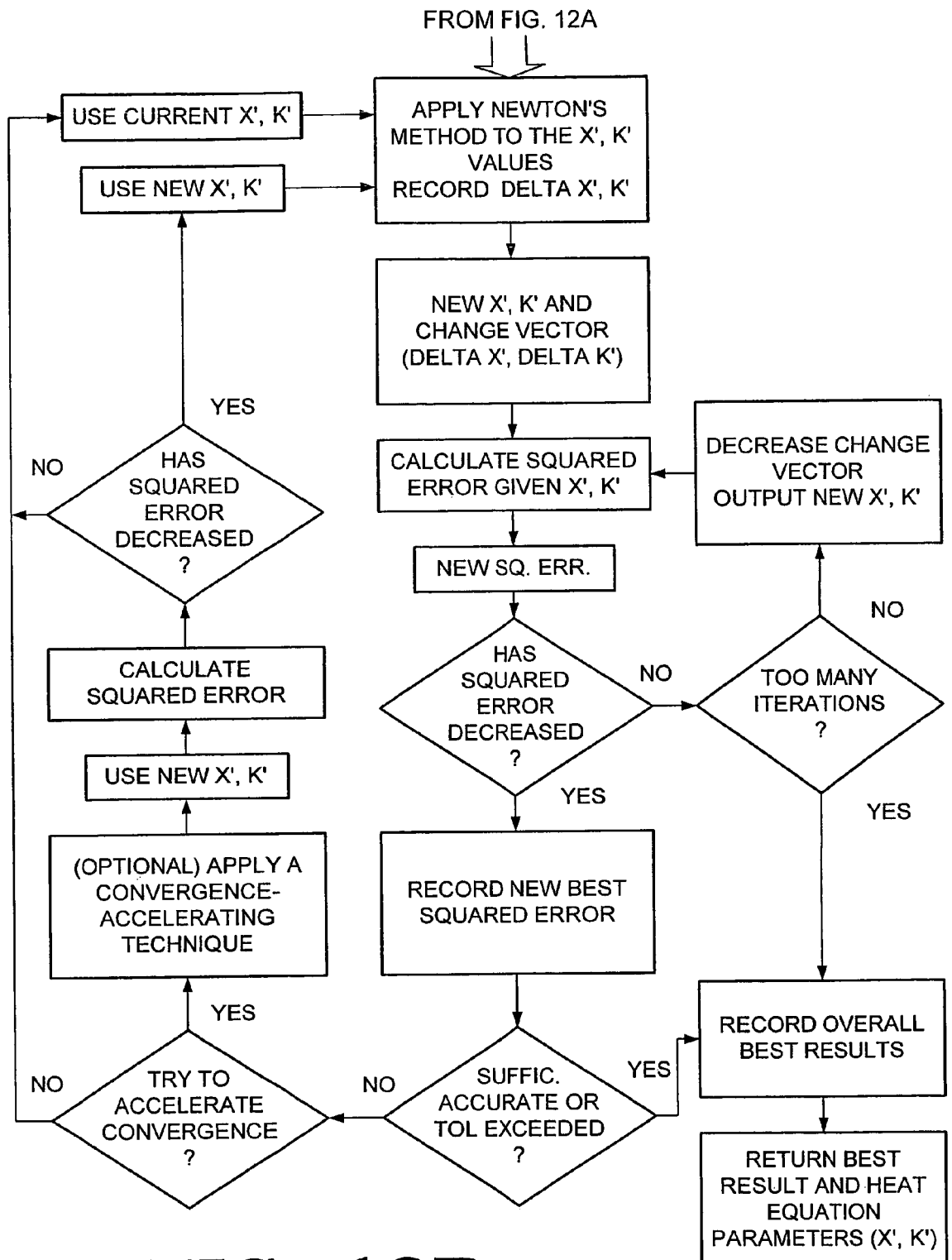
FIG. 12B is the second portion of a schematic flowchart of a process for calculating heat-equation parameters for controlling the heating apparatus to achieve a desired cooking or cooling time.

An exemplary process for calculating the heat-equation parameters used for predictive or adaptive cooking using the appliance is depicted in FIGS. 12A and 12B of the drawings. Initially, the process may include recording temperature data of the food item which is being heated or cooled, as well as recording the time that the measurement is taken. The instantaneous ambient temperature of the chamber of the appliance may also be recorded. The thermostat temperature of the chamber may also be recorded.

The heat equation utilized describes or predicts the internal temperature of the food item based upon the time, relative position (location of the temperature sensor in the food item), and the heat properties of the food item. The internal temperature sensor records the internal temperature of the food item, but neither the relative position of the sensor in the food item nor the heat-transfer characteristics (heat properties) of the food item, are known. Therefore, both the sensor position and the heat-transfer characteristics of the food item must be computed to best fit the heat-equation curve to the actual data being measured, for example, by the heat sensor. To simplify calculations, both the relative sensor position (mathematically represented as x) and the heat properties of the food item (mathematically represented as k) can be combined with other unknown parameters, specifically the relative size of the food item (mathematically represented as L). These aggregate mathematical variables are henceforth represented as x' and k', respectively. By using the aggregate x' and k' values for all calculations, knowledge of L becomes completely unnecessary.

After recording the temperature and time measurements, the following procedure may optionally be utilized to provide initial x' and k' values to be used in the heat equation H(x',k',t). For each x' ranging from near zero to 50%*pi, in increments of approximately 1% or 2%, k' is calculated to minimize the squared-error (SE) of the heat-equation, H(x',k',t). Each corresponding x', k' and SE value is recorded, as well as the 1st partial derivatives of the heat equation H(x',k',t) in x' and k'. The values of the local minimas (x' and k') are outputted to use as initial values or starting points.

In cases where no initial values for x' and k' are available (such as from the procedure described above), initial x' and k' values may be calculated or chosen using one of the following methods techniques. In one optional technique, a simple exponential curve approximation is used to determine a reasonable k' value. Then, a moderate x' value may be chosen or, for the given k', a value for x' may be determined that minimizes the SE of H(x',k',t). In another optional technique, typical x' and k' values are chosen based on "average" cooking data that has been stored in the memory for different food items. If the type of food item is known (e.g., input by the user via an interface), an "average" x' and k' value for that type of food item may be chosen.

When initial sets of values for x' and k' are obtained, then, for each set of initial x' and k' values, the data is curve-fit by varying both x' and k' to minimize the SE of the difference between H(x',k',t) and the recorded data. Each corresponding x', k', and SE value is recorded. The x' and k' values that result in the lowest SE value are output. If the algorithm provides a suitable convergence of the time expected to be necessary to cook the food item, and the time set by the user as the desired end time, then the process may proceed. If there is no suitable convergence with the values being considered, such as when the expected time to cook the food item is unrealistically less than or unrealistically greater than the time set by the user as the desired end time, the control system may wait until another periodic temperature is measured and recorded, and the process is repeated.

When a suitable convergence is detected, the expected cooking time is computed using the given x' and k' values, as well as the desired (final) temperature of the food item. The result may be displayed on the display. Optionally, the computed accuracy of expected cooking time may also be displayed. As another option, the expected cooking time(s) for other food item(s) also present in the chamber (each with its own temperature sensor) may be calculated and displayed, as well as the temperature of the air in the interior of the chamber.

Optionally, if the accuracy of the calculation is sufficient, then the new temperature (T_new) may be computed that is required to complete the cooking of the food item at the time set by the user. The new temperature may be displayed. The heating apparatus may be periodically adjusted so that the chamber temperature is the new temperature (T_new).

An illustrative algorithm to curve-fit the heat-equation is depicted in FIG. 12B of the drawings. Using the starting values x' and k', such as was described previously, Newton's Method is applied to both the k' variable and the x' variable or vector (in one or more dimensions) to generate new values for x' and k'. The change-vector may be recorded. If the new x' and k' values do not result in a smaller SE (Squared-Error) value, then the bisection method may be applied. The change-vector may be decreased, recorded, and added to the starting or initial x' and k' values. These steps may be repeated until the SE has a value that is smaller than the value that SE had to begin with. If the number of iterations performed becomes too great, then the algorithm may be stopped and an error flag may be indicated.

If the new x' and k' values result in a smaller SE (Squared-Error) value, then the new values of x' and k' may be recorded in place of the earlier x' and k' values, and these new values become the new starting values. If the results are determined to be sufficiently accurate, the results are recorded and returned to the control system.

Optionally, an attempt may be made to accelerate convergence using any one or more of suitable methods. These methods may include, for example, Steffensen's method, Mueller's method, the Steepest Descent method, or any other suitable method known to one of ordinary skill in the art. The application of these methods may be employed to generate new values for x' and k', and the change vector may be ignored. Again, if the new values for x' and k' give a smaller SE than the previous values for x' and k', then the new x' and k' values are recorded in place of the original initial values and these values become the new initial values. (Note: x' can be one-dimensional or a multi-dimensional vector, depending on the desired accuracy. For most applications, the simpler, one-dimensional x' should suffice.)

By adjusting the mathematical equations (i.e., the mathematical model), the above algorithms can be generalized to work in other situations. Example situations are described below:

1) The ambient temperature is not known. Assuming the ambient temperature remains substantially constant and uniform over time, the ambient temperature can be solved for, along with x' and k'.

2) The ambient temperature is not adjustable by the algorithm employed by the control system (such as, for example, when there is no feedback loop). The algorithm of the control system can rely on the user to adjust the ambient temperature. For example, the control system can display the recommended ambient temperature and/or display the time at which the heat must be removed to avoid overshoot (overcooking), or may provide an indication (e.g., beep) when heat should be removed by turning off the heating apparatus.

3) Accuracy can be improved by using a 3-dimensional model of the heat equation instead of the simpler 1-dimensional version. This allows accurate predictions with any size or shape object (as long as the heat-transfer rate is fairly homogeneous).

4) As meats cook, they lose (or possibly gain) moisture. The model can be adjusted to account for this and to calculate the amount of moisture loss/gain.

In various implementations of the invention, the basic heat equation (in one dimension) utilized is:

$$T(x, k, i) = T'_0 \sum_{n=1}^{\infty} \frac{1}{n} \sin(nx') e^{-n^2 k' i}, \text{ where}$$

$$T'_0 = \frac{4T_0}{\pi}, x' = \frac{\pi x}{L}, \text{ and } k' = \frac{\pi^2 k}{L^2}$$

The following equations describe an object being heated (or cooled):

$T_0$ is initial temperature at a given point in the object (wherever the probe is located).

u(i) is the temperature difference between the ambient temperature (external to the object) and the temperature at a given point in the object, i.e., the temperature sensor data.

$T_{model}$ is the expected temperature at a given time and position in the object, according to whatever x' and k' values are currently applied to the heat-equation.

$$T_0 \equiv T_{ambient}(t=0) - T_{probe}(t=0,$$

$$u(i) \equiv T_{ambient}(t=0) - T_{probe}(t_1)$$

$$T_{model}(x,t) = T_{ambient}(t=0) - T(x,k,t)$$

The following equation calculates the squared error between what the model predicts (for whatever x' and k' values are currently applied to the heat equation) and the actual recorded data. The goal is to minimize this error by modifying the x' and k' values to ensure as close a fit to the actual data as possible. W(i) is an optional weighting function that can be used to give emphasis to certain time periods.

$$F(x, k) = \text{Squared Error} =$$

$$\sum_{i=1}^{m} W(i)[T_{model}(x, t) - T_{probe}(t)]^2 = \sum_{i=1}^{m} W(i)[u(i) - T(x, k, t_1)]^2$$

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A heating appliance comprising:
   a chamber portion defining a heating chamber, the chamber portion including a perimeter wall extending about the heating chamber;
   a heating apparatus configured to heat air in the heating chamber;
   a temperature sensor configured to sense an internal temperature of an item located in the heating chamber;
   a user interface configured to receive designation of a desired time of completion of heating of the item from the user; and
   a control circuit configured to control the supply of power to the heating apparatus, the control circuit being in communication with the temperature sensor to receive a signal from the temperature sensor representing the temperature of the item, the control circuit being in communication with the user interface to receive a signal from the user interface representing the desired time of completion of heating of the item;
   wherein the control circuit is configured to control the supply of power to the heating apparatus so that the internal temperature at a location in the item reaches a predetermined temperature at the desired time of completion designated by the user;
   wherein the control circuit is configured to control the supply of power to the heating apparatus without requiring user input of a type of the item; and
   wherein the control circuit is configured to predict a time period for the food item to reach the desired temperature based upon a current temperature of the air in the heating chamber.

2. The heating appliance of claim 1 wherein the control circuit is further configured to control the supply of power to the heating apparatus so that the internal temperature at a location in the item is maintained at a predetermined temperature for a predetermined period of time before an end of the desired time of completion.

3. The heating appliance of claim 2 wherein the user interface is further configured to receive designation of the predetermined temperature and the predetermined period of time from the user and to communicate the predetermined time and the predetermined temperature to the control circuitry.

4. The heating appliance of claim 1, wherein the temperature sensor comprises a temperature probe configured to sense an internal temperature of the item when the probe is inserted into the item.

5. The heating appliance of claim 1 wherein the control circuit is further configured to periodically monitor the signal from the temperature sensor and adjust the supply of power to the heating apparatus based upon a temperature of the item indicated by the signal from the temperature sensor.

6. The heating appliance of claim 1 further comprising an ambient temperature sensor configured to sense a temperature of the air in the heating chamber and being in communication with the control circuit.

7. The heating appliance of claim 6 wherein the control circuitry is further configured to discontinue the supply of power to the heating assembly if the ambient temperature sensor detects that the air temperature exceeds a predetermined temperature.

8. The heating appliance of claim 1 wherein the control circuit is configured to control the supply of power to the heating apparatus without requiring user input of a weight of the item.

9. The heating appliance of claim 1 wherein the control circuit is configured to control the supply of power to the heating apparatus without requiring user input of a size of the item.

10. A heating appliance for cooking a food item comprising:
    a chamber portion defining a heating chamber, the chamber portion including a perimeter wall extending about the heating chamber;
    a heating apparatus configured to heat air in the heating chamber;
    a temperature sensor configured to sense an internal temperature of a food item located in the heating chamber;
    a user interface configured to receive designation of a desired time of completion of heating of the food item from the user; and a control circuit configured to control the supply of power to the heating apparatus, the control circuit being in communication with the temperature sensor to receive a signal from the temperature sensor representing the internal temperature of the food item, the control circuit being in communication with the user interface to receive a signal from the user interface representing the desired time of completion of heating of the food item;

wherein the control circuit is configured to control the supply of power to the heating apparatus such that the internal temperature at a location in the food item reaches a predetermined temperature at the desired time of completion using a prediction of heating characteristics of the food item based upon a heating curve for the food item that is generated using at least three data points recorded as the food item is being heated.

11. The heating appliance of claim 10 wherein the control circuit is further configured to control the supply of power to the heating apparatus so that the internal temperature at a location in the item reaches a predetermined temperature at the desired time of completion designated by the user.

12. The heating appliance of claim 10 wherein the user interface is further configured to receive designation of the predetermined temperature and the predetermined period of time from the user and to communicate the predetermined time and the predetermined temperature to the control circuitry.

13. The heating appliance of claim 10 wherein the temperature sensor comprises a temperature probe configured to sense an internal temperature of the item when the probe is inserted into the item.

14. The heating appliance of claim 10 wherein the control circuit is further configured to periodically monitor the signal from the temperature sensor and adjust the supply of power to the heating apparatus based upon a temperature of the item indicated by the signal from the temperature sensor.

15. The heating appliance of claim 10 further comprising an ambient temperature sensor configured to sense a temperature of the air in the heating chamber and being in communication with the control circuit.

16. The heating appliance of claim 10 wherein the control circuitry is further configured to discontinue the supply of power to the heating assembly if the ambient temperature sensor detects that the air temperature exceeds a predetermined temperature.

17. The heating appliance of claim 10 wherein the data points recorded by the control circuitry each include a time value and an internal temperature value for the internal temperature of the food item sensed by the temperature sensor at a time corresponding to the time value.

18. The heating appliance of claim 10 wherein the control circuitry utilizes each of the data points recorded as the food item is being heated for controlling the supply of power to the heating apparatus.

19. The heating appliance of claim 10 wherein the control circuitry is configured to determine a temperature of a central location of the food item regardless of the position of the temperature sensor in the food item.

20. A heating appliance for cooking a food item comprising:

a chamber portion defining a heating chamber, the chamber portion including a perimeter wall extending about the heating chamber;

a heating apparatus configured to heat air in the heating chamber;

a temperature sensor configured to sense an internal temperature of a food item located in the heating chamber;

a user interface configured to receive from the user designation of a desired internal temperature of the food item and a desired time of completion of heating of the food item; and a control circuit configured to control the supply of power to the heating apparatus, the control circuit being in communication with the temperature sensor to receive a signal from the temperature sensor representing the internal temperature of the food item, the control circuit being in communication with the user interface to receive a signal from the user interface representing the desired internal temperature of the food item and the desired time of completion of heating of the food item;

wherein the control circuit is configured to control the supply of power to the heating apparatus such that an internal temperature at a center location in the food item reaches the desired internal temperature at the desired time of completion using a prediction of heating characteristics of the food item based upon a heating curve for the food item that is generated using at least three data points recorded as the food item is being heated.

21. The heating appliance of claim 20 wherein the data points recorded by the control circuitry each include a time value and an internal temperature value for the internal temperature of the food item sensed by the temperature sensor at a time corresponding to the time value.

22. The heating appliance of claim 20 wherein the control circuitry utilizes each of the data points recorded as the food item is being heated for controlling the supply of power to the heating apparatus.

23. The heating appliance of claim 20 wherein the control circuitry is configured to determine a temperature of a central location of the food item regardless of the position of the temperature sensor in the food item.

* * * * *